(12) United States Patent
Feil et al.

(10) Patent No.: US 7,089,837 B2
(45) Date of Patent: Aug. 15, 2006

(54) COMBINATION TOOL

(75) Inventors: Erich Feil, Neckarwestheim (DE); Karl-Heinz Mueckschel, Loechgau (DE)

(73) Assignee: KOMET Praezisionswerkzeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 10/488,602

(22) PCT Filed: Aug. 24, 2002

(86) PCT No.: PCT/EP02/09472

§ 371 (c)(1),
(2), (4) Date: Mar. 1, 2004

(87) PCT Pub. No.: WO03/035316

PCT Pub. Date: May 1, 2003

(65) Prior Publication Data

US 2004/0194592 A1 Oct. 7, 2004

(30) Foreign Application Priority Data

Sep. 11, 2001 (DE) ................................ 101 44 759

(51) Int. Cl.
*B23B 29/34* (2006.01)
(52) U.S. Cl. ................... 82/1.4; 408/83; 408/158; 408/227
(58) Field of Classification Search ........... 408/81, 408/83, 82, 158, 227; 82/1.2, 1.4
See application file for complete search history.

(56) References Cited

U.S. PATENT DOCUMENTS

| | | | |
|---|---|---|---|
| 1,407,560 A | 2/1922 | Maxwell | |
| 2,350,778 A * | 6/1944 | Lang | 82/1.2 |
| 2,545,443 A * | 3/1951 | Bowren | 82/1.2 |
| 4,133,399 A * | 1/1979 | Herrmann | 175/384 |
| 4,184,794 A * | 1/1980 | Henninghaus | 408/57 |
| 4,231,691 A * | 11/1980 | Pape et al. | 408/185 |
| 4,264,246 A * | 4/1981 | Lowis et al. | 408/81 |
| 4,405,268 A * | 9/1983 | Abe | 408/182 |
| 4,508,475 A * | 4/1985 | Peuterbaugh | 408/153 |
| 4,595,320 A * | 6/1986 | Berner et al. | 408/182 |
| 4,784,535 A * | 11/1988 | Reinauer | 408/173 |
| 5,120,167 A * | 6/1992 | Simpson | 408/158 |
| 5,328,304 A * | 7/1994 | Kress et al. | 408/83 |
| 5,330,297 A * | 7/1994 | Engstrand | 408/153 |
| 5,921,727 A * | 7/1999 | Depperman | 408/144 |
| 6,033,159 A | 3/2000 | Kress et al. | |
| 6,379,090 B1 * | 4/2002 | Halley et al. | 408/227 |
| 6,406,225 B1 * | 6/2002 | Stojanovski | 408/183 |
| 6,655,883 B1 * | 12/2003 | Maar | 408/158 |

* cited by examiner

*Primary Examiner*—Boyer D. Ashley
*Assistant Examiner*—Sara Addisu
(74) *Attorney, Agent, or Firm*—Flynn, Thiel, Boutell & Tanis, P.C.

(57) ABSTRACT

A combination tool including a base body with several reaming blades each having a chamfer and a guide surface, arranged around the circumference of the base body, for reaming a cylinder bore. The combination tool also has at least one grooving blade arranged axially offset from the reaming blades and which may be extended radially relative to the base body. The combination tool is provided with two guide strips, arranged in the base body, at an angle to each other, between two reaming blades which are adjacent in the circumferential direction and displaced axially relative to the above in the direction of the grooving blade.

17 Claims, 2 Drawing Sheets

COMBINATION TOOL

FIELD OF THE INVENTION

The invention relates to a combination tool for use in machine tools for the machining of workpieces comprising a base body with several reaming blades for reaming a cylindrical bore, which reaming blades are distributively arranged over the circumference of the base body, and have a chamfer and a guide surface, and comprising at least one grooving blade arranged axially displaced with respect to the reaming blades and is radially movably controlled with respect to the base body.

BACKGROUND OF THE INVENTION

A combination tool of this type is known and has a high number, for example, ten, reaming blades distributively arranged over the circumference and a grooving blade radially movably controllable through a slide mechanism. The cutting forces occurring during the grooving operation are there received by the reaming blades supported in the bore. Due to the reaction forces occurring during the controlling of the grooving plates it is possible for the reaming blades to get caught on the wall of the bore. From this results a risk of vibration which can lead to complications during machining.

Starting out from this, the basic purpose of the invention is to improve the known combination tool of the above-disclosed type so that the risk of vibration is reduced during the grooving operation.

SUMMARY OF THE INVENTION

The solution of the invention is based on the knowledge that the above-listed problems can be reduced by the use of guide strips having a crowned surface for receiving the reaction forces occurring during the grooving operation. In order to achieve this, two guide strips are provided, according to the invention, and are arranged at an angular distance from one another between two circumferentially mutually adjacent reaming blades in the base body, and are displaced axially with respect to these in direction of the grooving blade and have the same flight-circle radius as the reaming blades, and which support during the grooving operation at an angular distance on opposite sides of the cutting-force resultant of at least one grooving blade within the bore. Due to the axial displacement, the reaming operation is first performed when machining a bore, and only after it has been finished is the grooving operation carried out. Because of the inventive measures neither a chip formation nor a getting caught in the area of the reaming blades occurs during the grooving operation.

A further improvement in this respect can be achieved by providing at least one further guide strip arranged near the grooving blade, and which provides support essentially perpendicularly with respect to its cutting-force resultant within the bore.

According to a preferred embodiment of the invention two simultaneously controllable grooving blades are provided, which are essentially diametrically opposite one another in the base body, and which have a common cutting-force resultant, which is position-stable in circumferential direction during the grooving operation. One of the two grooving blades can thereby function as a piercing blade or a roughing blade and the other one as a finishing grooving blade or a smoothing blade, whereby the roughing blade has always a greater cutting force than the smoothing blade. Such an arrangement results in a common cutting-force resultant, which is smaller than this is the case with only one grooving blade and thus brings about a reduction of the anti-penetration action.

The more reaming blades that exist, the less is the space that is available for the guide strips. This can have the result that an equidistant angular pitch is not possible between the reaming blades. In this case, an adjusted axial displacement of the reaming blades can be provided to assure that an even cutting distribution on the reaming blades is nevertheless achieved. The phase shifting of the individual blades is compensated for by the axial adjustment feature.

The invention will be discussed hereinafter in greater detail in connection with the drawings, in which:

DETAILED DESCRIPTION

Figure 4:
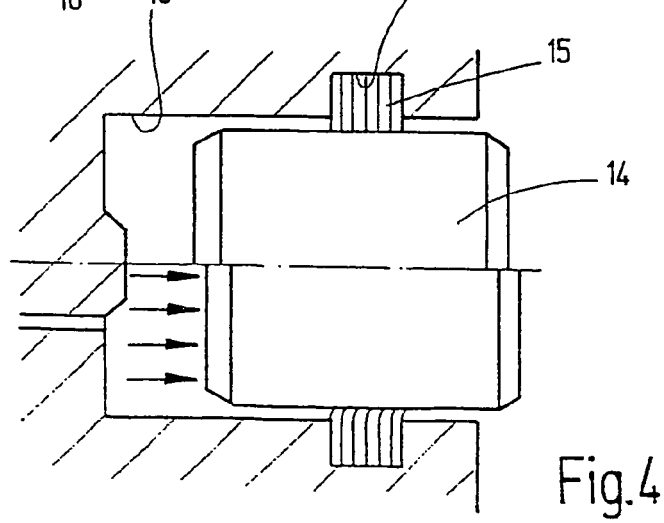
FIG. 4 shows a fragment of a floating caliper disk brake, the cylinder bore of which was radially enlarged with the help of a combination tool according to FIGS. 1 to 3.

The combination tools illustrated in the drawings are designated for the reaming of cylinder bores 10 and for creating a radial enlargement 12 in the wall of the cylinder bore (FIG. 4). Bores of this type are used, for example, in the car industry in floating caliper disk brakes. The cylinder bore 10 is there designated to receive a piston 14, whereas the radial enlargement 12 is designated to receive a rubber packing ring 15 which bridges and pressure seals the annular space between the cylinder bore and piston. The piston 14 is illustrated in the resting state in the upper half of FIG. 4 and in the braking state in the lower half.

The combination tool has a base body 16, on the distal end of which are several reaming blades 18 distributively arranged over its circumference. The reaming blades 18 have each a chamfer 20 as the main blade and a guide surface 22 axially following said chamfer and defining the flight-circle radius. A grooving blade 26, which is radially movably controlled with the aid of a slide mechanism 24, is arranged in the base body 16 in FIGS. 1 and 2, whereas two diametrically opposed, together radially movably controllable grooving blades 26', 26" are provided in FIG. 3. A radially extending cutting-force resultant 28 is transmitted onto the bore wall through two guide strips 30 which are circumferentially spaced from one another on the base body while receiving the reaction forces 29, all during the grooving operation. In order to avoid during the grooving operation the formation of chips in the area of the reaming blades 18, the two guide strips 30 are arranged between two circumferentially mutually adjacent reaming blades 18 and on opposite sides of the cutting-force resultant 28 of at least one of the grooving blades 26. As can be seen from the symbolic illustration according to FIG. 2*b*, the reaming blades 18 and the adjacent guide strips 30 are displaced axially relative to one another so that during the reaming operation first through the chamfer 20 and the adjacent guide surface 22 a chip-forming reaming takes place and subsequently through the guide strips 30 support is provided. The guide strips 30 have the same flight-circle radius as the reaming blades 18.

Figure 1:
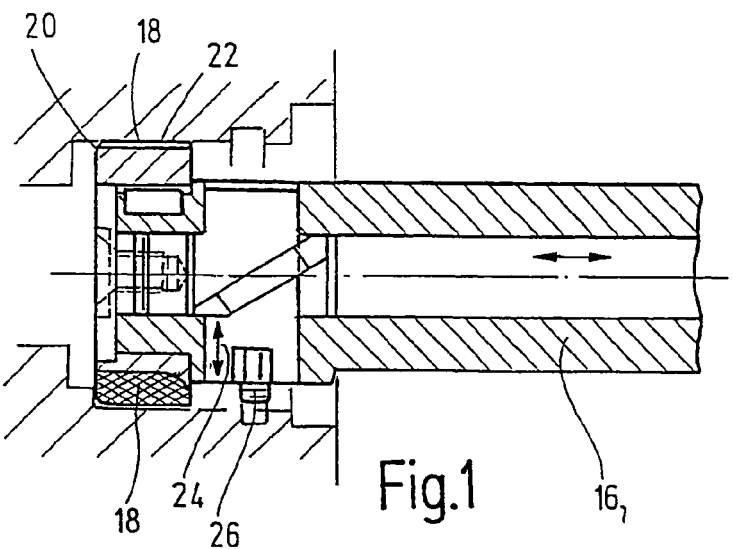
FIG. 1 is a longitudinal cross-sectional view of a combination tool having reaming blades, a grooving blade, and guide strips.
Figure 2A:
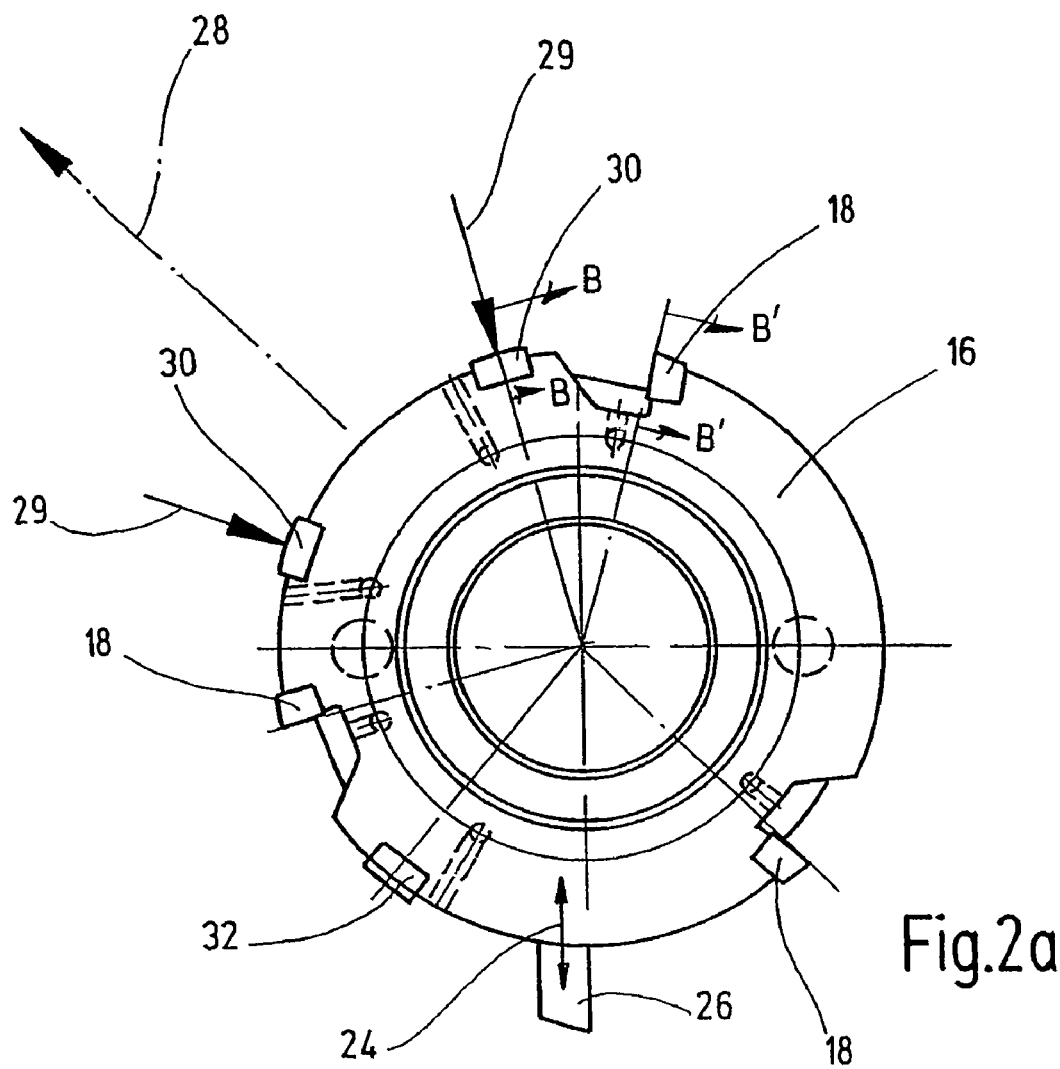
FIG. 2*a* is a distal end view of the combination tool according to FIG. 1.
Figure 2B:
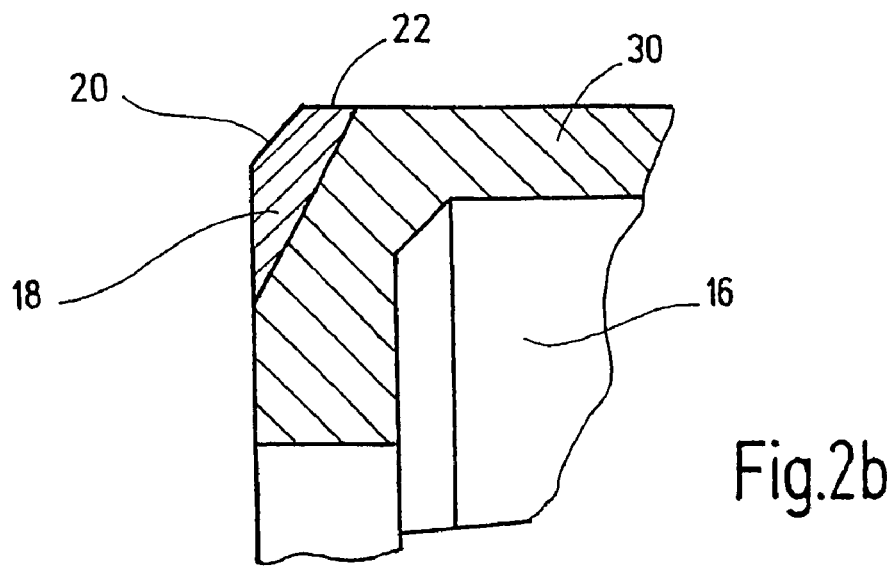
FIG. 2*b* is an enlarged illustration showing two superposed fragmentary sections taken along the lines B, B' of FIG. 2*a;*

The exemplary embodiment illustrated in FIG. 1 has a further guide strip 32 arranged near the grooving blade 26 to provide support essentially perpendicularly with respect to the cutting-force resultant 28 in the bore.

Figure 3:
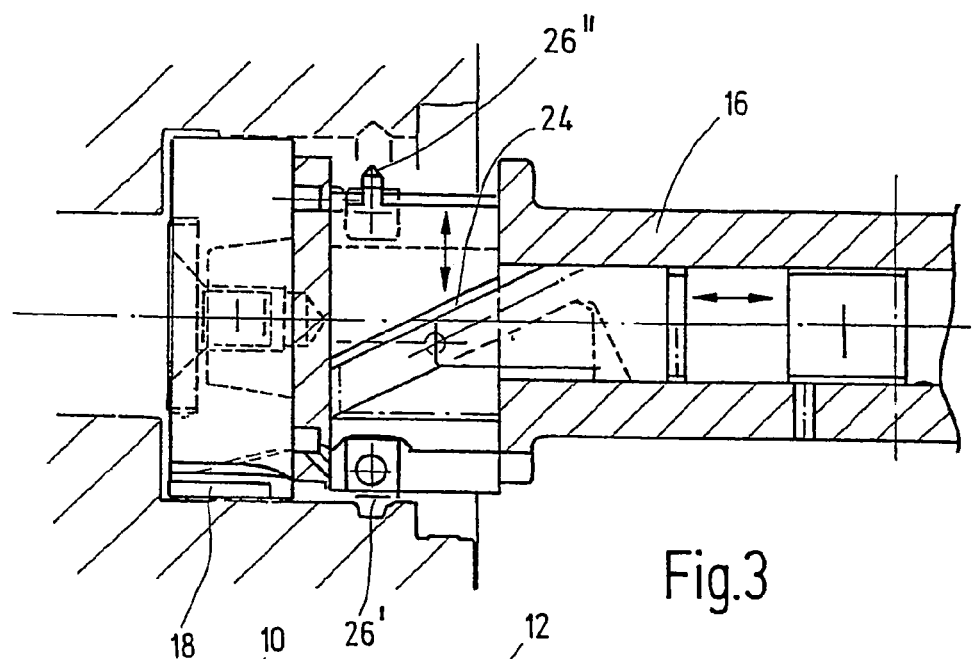
FIG. 3 is a fragmentary longitudinal cross section of a modified exemplary embodiment of a combination tool having two radially controllable grooving blades.

The exemplary embodiment illustrated in FIG. 3 shows the two grooving blades 26', 26" to lie essentially diametrically opposite one another in the base body and to be simultaneously controllable. The one grooving blade 26' is thereby a piercing blade, whereas the other grooving blade 26" is a finishing grooving blade. The grooving blades 26', 26" are designed in such a manner that their cutting forces do not exactly compensate but a stable common cutting-force resultant 28 results during the grooving operation, based on which resultant the optimum arrangement of the guide strips 30 can be determined.

In summary the following can be stated: The invention relates to a combination tool for use in machine tools for the machining of workpieces. The combination tool has a base body 16 with several reaming blades 18 for reaming a cylinder bore, which reaming blades are distributively arranged over the circumference of the base body, and each have a chamfer 20 and a guide surface 22, and comprising at least one grooving blade 26 arranged axially displaced with respect to the reaming blades 18, and is radially movably controllable with respect to the base body 16. The combination tool is according to the invention equipped with two guide strips 30 arranged at an angular distance from one another between two circumferentially mutually adjacent reaming blades 18 in the base body, and are displaced axially with respect to the reaming blades 18 in direction of the grooving blade 26. The guide strips 30 are located at an angular distance on opposite sides of the cutting-force resultant 28 of the grooving blade 26 within the bore and provide support during the grooving operation. The guide strips 30 have the same flight-circle radius as the reaming blades 18.

We claim:

1. A combination tool for use in machine tools for the machining of workpieces comprising a base body with several reaming blades for reaming a cylindrical bore, which reaming blades are distributively arranged over the circumference of the base body, and have a chamfer and a guide surface, the combination tool further comprising at least one grooving blade arranged axially displaced on the base body with respect to the reaming blades, and controllable radially with respect to the base body, wherein two guide strips are arranged at an angular distance from one another between two circumferentially mutually adjacent reaming blades in the base body, and are displaced axially with respect to the reaming blades in direction of the grooving blade, the guide strips have the same flight-circle radius as the reaming blades, and provide support during a grooving operation at an angular distance on opposite sides of a cuttingforce resultant of the at least one grooving blade within a bore.

2. The combination tool according to claim 1, wherein at least one additional guide strip is arranged near the grooving blade to provide support essentially perpendicularly with respect to its cutting-force resultant within the bore.

3. The combination tool according to claim 1, wherein two of said grooving blades are provided, which are essentially diametrically opposite one another over the circumference of the base body, and are simultaneously controllable, and which have a cutting-force resultant which is positionstable in a circumferential direction during the grooving operation.

4. The combination tool according to claim 3, wherein one of the grooving blades comprises a piercing blade and the other grooving blade comprises a finishing grooving blade.

5. The combination tool according to claim 1, wherein at least some of the reaming blades have varying angular distances and are arranged axially displaced with respect to one another.

6. The combination tool according to claim 1, wherein adjacent ones of the reaming blades have in part varying angular distances and an axial displacement adjusted thereto.

7. The combination tool according to claim 6, wherein the varying angular distances and the axial displacement are adjusted to one another in such a manner that during the reaming operation with a specified advance there results an even cutting distribution on the reaming blades.

8. The combination tool according to claim 1, wherein the circumference of said base body is free from the presence of any one of said guide strips spaced axially from between a first one of the reaming blades and an adjacent second one of the reaming blades.

9. The combination tool according to claim 1, wherein said guide strips are spaced about less than half of the circumference of the base body.

10. The combination tool according to claim 1, wherein said at least one grooving blade comprises first and second grooving blades, wherein said at least two guide strips are positioned near respective ones of the grooving blades to provide support essentially perpendicularly with respect to a cutting-force resultant within the bore.

11. A combination tool for use in machine tools for the machining of workpieces comprising a base body with several reaming blades for reaming a cylindrical bore, which said reaming blades are distributively arranged over a circumference of the base body, and have a chamfer and a guide surface, the combination tool further comprising at least one grooving blade arranged axially displaced with respect to the reaming blades, and capable of being radially movably controlled with respect to the base body, and at least two guide strips for providing support during a grooving operation by the at least one grooving blade, wherein adjacent reaming blades have in part varying angular distances and an axial displacement adjusted thereto.

12. A combination tool for machining of workpieces comprising:

a base body having a circumference thereabout;

several reaming blades for reaming a cylindrical bore located at angular distances from one another and spaced radially about the circumference of the base body;

at least one grooving blade arranged axially displaced with respect to the reaming blades; and at least two guide strips arranged at an angular distance from one another and spaced radially about the circumference of the base body, the two guide strips being displaced axially with respect to the reaming blades in the direction of the at least one groove blade and located between first and second circumferentially mutually adjacent ones of the reaming blades, the guide strips having the same flight-circle radius as the reaming blades and providing support during a grooving operation by the at least one grooving blade within a bore in a workpiece.

13. The combination tool according to claim 12, comprising an additional guide strip arranged near the at least one grooving blade to provide support perpendicularly with respect to its cuttingforce resultant.

14. The combination tool according to claim 12, further comprising a slide mechanism for guiding said at least one grooving blade radially outwardly to form a groove in a cylindrical bore.

15. The combination tool according to claim 12, wherein said guide strips are spaced about less than half of the circumference of the base body.

16. The combination tool according to claim 12, wherein said at least one grooving blade comprises first and second grooving blades, wherein said at least two guide strips are positioned near respective ones of the grooving blades to provide support essentially perpendicularly with respect to a cutting-force resultant within the bore.

17. A combination tool for machining of workpieces comprising:

a base body having a circumference thereabout;

several reaming blades for reaming a cylindrical bore located at angular distances from one another and spaced radially about the circumference of the base body;

at least one grooving blade arranged axially displaced with respect to the reaming blades; and at least two guide strips arranged at an angular distance from one another and spaced radially about the circumference of the base body, the two guide strips being displaced axially with respect to the reaming blades in the direction of the at least one groove blade, the guide strips having the same flight-circle radius as the reaming blades and providing support during a grooving operation by the at least one grooving blade within a bore in a workpiece, wherein the circumference of said base body is free from the presence of any one of said guide strips spaced circumferentially between a first one of the reaming blades and an adjacent second one of the reaming blades.

* * * * *